United States Patent Office 3,147,234
Patented Sept. 1, 1964

3,147,234
MODIFIED OXYMETHYLENE POLYMERS
George W. Polly, Jr., Corpus Christi, Tex., assignor to Celanese Corporation of America, New York, N.Y., a corporation of Delaware
No Drawing. Filed Sept. 24, 1958, Ser. No. 762,939
15 Claims. (Cl. 260—67)

This invention relates to polymers which are structurally related to polyoxymethylene and particularly to polymers of high thermal stability. This invention also relates to a method for making polymers of high thermal stability and to a method for improving the thermal stability of polymers.

Polyoxymethylene polymers, having recurring

—$CH_2O$— units have been known for many years. They may be prepared by the polymerization of anhydrous formaldehyde or by the polymerization of trioxane which is a cyclic trimer of formaldehyde. Polyoxymethylene varies in thermal stability and in molecular weight, depending on its method of preparation.

High molecular weight polyoxymethylenes have been prepared by polymerizing trioxane in the presence of certain fluoride catalysts such as antimony fluoride and may also be prepared in high yields and rapid reaction rates by the use of catalysts comprising boron fluoride coordination complexes with organic compounds, as described in application Serial No. 691,143, filed October 21, 1957, now Patent No. 2,989,406, by Donald E. Hudgin and Frank M. Berardinelli. Boron fluoride gas is also a rapid and effective catalyst, as disclosed in application Serial No. 691,144, also filed October 21, 1957, now Patent No. 2,989,507 by Hudgin and Berardinelli.

Although polyoxymethylenes prepared by some methods are much more stable against thermaldegradation than those prepared by other methods, it is nevertheless desirable for many uses that the thermal stability be increased.

It has now been found that there is extraordinary heat stability in the reaction product of an isocyanate with an oxymethylene-cyclic ether copolymer containing from 60 to 99.6 mol percent of recurring oxymethylene units, said cyclic ether having at least two adjacent carbon atoms.

The reaction product of an isocyanate with an oxymethylene homopolymer produces a product of improved thermal stability but not a product of the same order of stability as the products of this invention.

It appears that the susceptibility of polyoxymethylene polymers to isocyanate stabilization is greatly enhanced by incorporating into the polymer structure units derived from cyclic ethers having at least two adjacent carbon atoms. The susceptibility of these copolymers to isocyanate stabilization is not related to their thermal stability in the raw state. This is evident from the fact that copolymers prepared under such reaction conditions or in such molecular proportions that their thermal degradation rates are higher than those of a particular homopolymer may be improved to lower degradation rates than the homopolymer when both are subjected to the same isocyanate stabilization procedure.

Among the copolymers which are utilized in accordance with this invention are those having a structure comprising recurring units having the formula

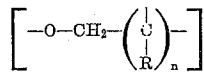

wherein R is selected from the group consisting of hydrogen and lower alkyl radicals, wherein $n$ is an integer from zero to 5 and wherein $n$ is zero in from 60 to 99.6 percent of the recurring units.

A preferred class of copolymers are those having a structure comprising recurring units having the formula [—O—$CH_2$—($CH_{2n}$—] wherein $n$ is an integer from from zero to 2 and wherein $n$ is zero in from 60 to 99.6 percent of the recurring units. These copolymers are prepared by copolymerizing trioxanes wtih a cyclic ether having the structure

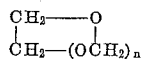

where $n$ is an integer from zero to two.

Among the specific cyclic ethers which may be used are ethylene oxide, 1,3-dioxolane, 1,3,5-trioxepane, 1,3-dioxane, trimethylene oxide, pentamethylene oxide, 1,2-propylene oxide, 1,2-butylene oxide, neopentyl formal, pentaerythritol diformal, paraldehyde, tetrahydrofuran, and butadiene monoxide.

The preferred catalysts used in the preparation of the desired copolymers are the boron fluoride coordination complexes with organic compounds in which oxygen or sulfur is the donor atom.

The coordination complexes of boron fluoride may, for example, be a complex with a phenol, an ether, an ester, or a dialkyl sulfide. Boron fluoride dibutyl etherate, the coordination complex of boron fluoride with dibutyl ether, is the preferred coordination complex. The boron fluoride complex with diethyl ether is also very effective. Other boron fluoride complexes which may be used are the complexes with methyl acetate, with ethyl acetate, with phenyl acetate, with dimethyl ether, with methyl phenyl ether and with dimethyl sulfide.

The coordination complex of boron fluoride should be present in the polymerization zone in amounts such that its boron fluoride content is between about 0.001 and about 1.0 weight percent based on the weight of the monomers in the polymerization zone. Preferably, amounts between about 0.003 and about 0.1 weight percent should be used.

The monomers in the reaction zone are preferably anhydrous or substantially anhydrous. Small amounts of moisture, such as may be present in commercial grade reactants or may be introduced by contact with atmospheric air will not prevent polymerization, but should be essentially removed for best yields.

In the preferred embodiment of this invention, the trioxane, cyclic ether and catalyst are dissolved in a common anhydrous solvent, such as cyclohexane and permitted to react in a sealed reaction zone. The temperature in the reaction zone may vary from about 0° C. to about 100° C. The period of reaction may vary from about 5 minutes to about 72 hours. Pressures from subatmospheric to about 100 atomspheres, or more may be used, although atmospheric pressure is preferred.

It has been found that the relatively minor amounts of the cyclic ether other than trioxane used in the copolymerization reaction generally disappear completely from the reaction mixture. The required ratio of trioxane to cyclic ether in the reaction mixture may therefore be roughly predetermined for a desired mol ratio in the polymer by assuming that all of the cyclic ether is used up and by assuming a particular conversion level from previous experience under substantially comparable conditions.

The chemical constitution of the cyclic ether must also be considered. Thus, 1,3-dioxolane contains both an oxymethylene group and an oxyethylene group. Its incorporation into the copolymer molecule increases both the oxymethylene and the oxyethylene content of the polymer molecule.

In general, the cyclic ether is present in the reaction mixture in amounts between about 0.2 and about 30 mol percent, based on the total moles of monomer. The optimum proportion will depend on the particular copolymer desired, the expected degree of conversion and the chemical constitution of the cyclic ether used.

The copolymers produced from the preferred cyclic ethers in accordance with this invention have a structure substantially composed of oxymethylene and oxyethylene groups in a ratio from about 250 to 1 to about 1.5 to 1.

The isocyanates which may be used in accordance with this invention may be either aliphatic or cyclic. Compounds containing two or more isocyanate groups are preferred. Among the specific isocyanate compounds which may be used are aromatic diisocyanates, such as toluene-2,4-diisocyanate, 3,3'-dimethyl-4,4'-diphenylenediisocyanate, 1,5-naphthalene diisocyanate, p-p'-diphenylmethane diisocyanate, m-phenylene diisocyanate, p-phenylene diisocyanate and methane diisocyanate; aromatic monoisocyanates, such as α-naphthyl isocyanate, p-chlorophenyl isocyanate and phenyl isocyanate; aliphatic monoisocyanates, such as butyl isocyanate and octadecyl isocyanate; aliphatic diisocyanates such as hexamethylene diisocyanate; and triisocyanates, such as triphenylmethane triisocyanate and the reaction product of trimethylol propane with toluene-2,4-diisocyanate.

The reaction is carried out in a system wherein the isocyanate and the polymer are in intimate admixture. The polymer may be in the form of finely divided solid particles, as in a slurry, but for best results the polymer and the isocyanate are dissolved in a common solvent. The preferred common solvent is a mixture comprising a major weight proportion of gamma butyrolactone and a minor proportion of a nitrogen-containing organic compound, such as dimethyl formamide, which has no hydrogen atoms linked directly to its nitrogen. Other nitrogen-containing organic compounds which may be used in the preferred solvent include tri-n-butylamine and N, methyl morpholine.

Other solvents which may be used include gamma butyrolactone and anisole. Mixtures of compounds may be used as solvents, such as mixtures of diethyl phthalate and dimethylformamide and the gamma butyrolactone and dimethylformamide mixtures mentioned above.

The proportion of isocyanate reactant to the polymer may vary suitably from about 0.1% to about 10% by weight. In solution reactions the proportion is between about 0.5% and about 3.0% by weight.

The temperature of the isocyanation reaction is suitably at least about 50° C. and preferably from about 130° to about 180° C.

The period of reaction is suitably at least 1 minute and preferably from about 5 to about 30 minutes.

After the reaction, the polymer is recovered from the solvent by cooling or by evaporation of the solvent, and the excess isocyanate is washed off with a wash liquid such as acetone or cyclohexane.

Thermal degradation rates are substantially reduced by the treatment of this invention. Thermal degradation is determined at 222° C. in a circulating air oven in which the samples are maintained in open dishes mounted on a turntable rotating at 3 r.p.m. and in which the samples may be weighed without removal from the oven.

*Example I*

To a three liter flask, fitted with stirrer and reflux condenser, was added 800 g. trioxane, 800 g. cyclohexane and 20 g. (2.5 weight percent, based on trioxane charge) of 1,3-dioxolane. The reaction mixture was heated to 60°±0.5° in a constant temperature bath. Boron trifluoride dibutyl etherate 0.021 volume/weight percent (based on total charge) was added to the mixture. The reaction medium was held at 60°±0.5° for three hours. At the end of three hours reaction time, 5 mls. of tri-n-butylamine was added to stop the reaction. The mixture was cooled, removed from flask and washed in a blender with acetone, dried in an oven at 65° to 70° C. The yield was 366 g. or 44.7 weight percent of solid polymer based on the charge of trioxane and 1,3-dioxolane.

The above procedure was repeated with mixtures containing 40 grams of 1,3-dioxolane instead of the 20 grams in the above description, corresponding to 10 weight percent, based on the trioxane charge. The procedure was also repeated with 20 parts of 1,3-dioxolane except that in this case the cyclohexane was omitted. The yields were 36.3% and 77.6%, respectively, based on the charge of trioxane.

Each of the copolymers was dissolved in a solution of 90 weight percent of gamma butyrolactone and 10 weight percent of dimethyl formamide containing 1.0 weight percent of toluene-2,4-diisocyanate at a temperature of 170° C. The solutions were maintained at this temperature for a period of less than one minute and then allowed to cool to room temperature. The cooled semisolid reaction mass containing precipitated polymer was broken up, slurried in a blender with acetone and then filtered. The filter cake was reslurried and refiltered three times and then dried for four hours in an oven at 65° to 75° C.

Thermal degradation rates for each of the treated and untreated polymers was determined at 222° C., as described above.

The thermal degradation rates were as follows:

| Wt. percent of 1,3-dioxolane [a] | Percent degradation at 222° C. per minute | | |
|---|---|---|---|
| | Untreated | Treated | Inherent Viscosity [b] |
| 20.0 | 1.20 | 0.035 | 0.64 |
| 10.0 | 1.90 | 0.035 | 1.02 |
| 2.50 | 2.40 | 0.045 | 1.31-1.32 |

[a] Based on weight of trioxane.
[b] Measured in 0.1 weight percent solution in p-chlorophenol containing 2 percent α-pinene at 60° C.

*Example II*

Trioxane was copolymerized with neopentyl formal and with pentaerythritol diformal in accordance with the above described procedure, except that the ratio of trioxane to cyclohexane solvent was 1.5 to 1. The reaction mixtures contained 3.9 weight percent of neopentyl formal and 2.19 weight percent of pentaerythritol diformal, respectively, in each case, based on the weight of the trioxane charge. The yields were 43.7 and 40.0%, respectively. The neopentyl formal copolymer had a raw thermal degradation rate in excess of 15% per minute and the pentaerythritol diformal copolymer had a raw thermal degradation rate of 3.50% per minute.

After treatment with toluene-2,4-diisocyanate, as described above, the thermal degradation rates were reduced to 0.32% per minute and 0.29% per minute, respectively.

It is to be understood that the foregoing detailed description is given merely by way of illustration and that many variations may be made therein without departing from the spirit of my invention.

Having described my invention, what I desire to secure by Letters Patent is:

1. The resinous reaction product of an isocyanate with a resinous oxymethylene cyclic ether copolymer containing from 60 to 99.6 mol percent of recurring oxymethylene units and 0.4 to 40 mol percent of monomeric units obtained by the opening of said cyclic ethers between a carbon atom and an etheric oxygen atom, said cyclic ether having at least two adjacent carbon atoms, the amount of said isocyanate being sufficient to stabilize said copolymer but not in excess of 10 weight percent thereof.

2. The resinous reaction product of an isocyanate with a resinous copolymer of trioxane and a cyclic ether having at least two adjacent carbon atoms, said copolymer containing from 60 to 99.6 mol percent of recurring oxymethylene units and 0.4 to 40 mol percent of monomeric units obtained by the opening of said cyclic ethers between a carbon atom and an etheric oxygen atom.

3. The resinous reaction product of an isocyanate with a resinous copolymer of trioxane and a cyclic ether having the structure

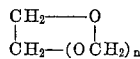

where $n$ is an integer from zero to 2, said copolymer containing from 60 to 99.6 mol percent of recurring oxymethylene units and 0.4 to 40 mol percent of recurring oxyethylene units, the amount of said isocyanate being 0.1 to 10 weight percent of said resinous reaction product.

4. The resinous reaction product of an isocyanate with a resinous copolymer of trioxane and 1,3-dioxolane, said copolymer containing from 60 to 99.6 mol percent of recurring oxymethylene units and 0.4 to 40 mol percent of recurring oxyethylene units, the amount of said isocyanate being 0.1 to 10 weight percent of said resinous reaction product.

5. The resinous reaction product of an aromatic diisocyanate with a resinous copolymer of trioxane, and 1,3-dioxolane, said copolymer containing from 60 to 99.6 mol percent of recurring oxymethylene units and 0.4 to 40 mol perecnt of recurring oxyethylene units, the amount of said diisocyanate being 0.1 to 10 weight percent of said resinous reaction product.

6. Method for improving the thermal stability of a resinous oxymethylene cyclic ether copolymer containing from 60 to 99.6 mol percent of recurring oxymethylene units and 0.4 to 40 mol percent of monomeric units obtained by the opening of said cyclic ethers between a carbon atom and an etheric oxygen atom wherein said cyclic ether has at least two adjacent carbon atoms which comprises reacting said copolymer with 0.1 to 10 weight percent, based on the weight of copolymer of an isocyanate.

7. Method for improving the thermal stability of a resinous copolymer of trioxane and a cyclic ether having at least two adjacent carbon atoms said copolymer containing from 60 to 99.6 mol percent of recurring oxymethylene units and 0.4 to 40 mol percent of monomeric units obtained by the opening of said cyclic ethers between a carbon atom and an etheric oxygen atom which comprises dissolving said copolymer and 0.5 to 3 weight percent, based on the weight of the copolymer, of an isocyanate in a common solvent, maintaining said solution at a temperature of at least 50° C. for a period of at least 1 minute and thereafter recovering improved copolymer from solution.

8. The method of claim 7 wherein said isocyanate is a diisocyanate.

9. The method of claim 7 wherein said diisocyanate is toluene-2,4-diisocyanate.

10. The method of claim 7 wherein said temperature is between about 130° and about 180° C. and said period is between about 1 minute and about 30 minutes.

11. Method for improving the thermal stability of a resinous copolymer of trioxane and a cyclic ether having at least two adjacent carbon atoms said copolymer containing from 60 to 99.6 mol percent of recurring oxymethylene units and 0.4 to 40 mol percent of monomeric units obtained by the opening of said cyclic ethers between a carbon atom and an etheric oxygen atom, which comprises dissolving said copolymer and 0.5 to 3 weight percent, based on the weight of the copolymer of a diisocyanate in a common solvent comprising a major weight proportion of gamma butyrolactone and a minor weight proportion of a nitrogen-containing organic compound which has no hydrogen atoms directly linked to its nitrogen, maintaining said solution at a temperature of at least 50° C. for a period of at least 1 minute and thereafter recovering improved copolymer from solution.

12. The method of claim 11 wherein said nitrogen-containing organic compound is dimethyl formamide.

13. The method of claim 11 wherein said nitrogen-containing organic compound is tri-n-butylamine.

14. Method for preparing a thermally stable polymer which comprises copolymerizing trioxane with a cyclic ether having at least two adjacent carbon atoms to produce a resinous copolymer having from 60 to 99.6 mol percent of recurring oxymethylene units and 0.4 to 40 mol percent of monomeric units obtained by the opening of said cyclic ethers between a carbon atom and an etheric oxygen atom and reacting said copolymer with 0.1 to 10 weight percent, based on the weight of copolymer of an isocyanate.

15. Method for preparing a thermally stable polymer which comprises copolymerizing trioxane with 1,3-dioxolane to produce a resinous copolymer having from 60 to 99.6 mol percent of recurring oxymethylene units and 0.4 to 40 mol percent of recurring oxyethylene units, dissolving said copolymer and 0.5 to 3 weight percent, based on the weight of the copolymer of a diisocyanate in a common solvent comprising a major weight proportion of gamma butyrolactone and a minor weight proportion of a nitrogen-containing organic compound which has no hydrogen atoms directly linked to its nitrogen.

References Cited in the file of this patent

UNITED STATES PATENTS

| | | |
|---|---|---|
| 2,625,569 | Gresham et al. | Jan. 13, 1953 |
| 2,871,227 | Walter | Jan. 27, 1959 |
| 3,027,352 | Walling et al. | Mar. 27, 1962 |

FOREIGN PATENTS

| | | |
|---|---|---|
| 557,873 | Great Britain | Dec. 9, 1943 |
| 748,856 | Great Britain | May 9, 1956 |

Disclaimer 3,147,234.—*George W. Polly, Jr.*, Corpus Christi, Tex. MODIFIED OXYMETHYLENE POLYMERS. Patent dated Sept. 1, 1964. Disclaimer filed Mar. 13, 1970, by the assignee, *Celanese Corporation*.

Hereby enters this disclaimer to claims 1 to 15, inclusive, of said patent.

[*Official Gazette April 28, 1970.*]